(12) United States Patent
Wang et al.

(10) Patent No.: US 10,243,852 B2
(45) Date of Patent: *Mar. 26, 2019

(54) LOOK-UP TABLE CREATION METHOD AND QUERY METHOD, CONTROLLER, FORWARDING DEVICE, AND SYSTEM

(71) Applicant: Huawei Technologies Co., Ltd., Shenzhen (CN)

(72) Inventors: Wenming Wang, Wuhan (CN); Zhiqiang Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/620,522

(22) Filed: Jun. 12, 2017

(65) Prior Publication Data
US 2017/0279718 A1    Sep. 28, 2017

Related U.S. Application Data

(63) Continuation of application No. 14/749,261, filed on Jun. 24, 2015, now Pat. No. 9,705,795, which is a (Continued)

(51) Int. Cl.
*H04L 12/743* (2013.01)
*H04L 12/64* (2006.01)
*H04L 12/771* (2013.01)
(Continued)

(52) U.S. Cl.
CPC ...... *H04L 45/7453* (2013.01); *H04L 12/6418* (2013.01); *H04L 45/42* (2013.01);
(Continued)

(58) Field of Classification Search
CPC ................................................. H04L 45/7453
See application file for complete search history.

(56) References Cited

U.S. PATENT DOCUMENTS 7,756,150 B2    7/2010 Yang
9,705,795 B2 *  7/2017 Wang .................. H04L 12/6418
(Continued)

FOREIGN PATENT DOCUMENTS

CN    1538663 A    10/2004
CN    1964311 A    5/2007
(Continued)

OTHER PUBLICATIONS

"OpenFlow Switch Specification," Open Networking Foundation, Version 1.2 (Wire Protocol 0x03), ONF TS-003, Dec. 5, 2011, 86 pages.

*Primary Examiner* — Albert T Chou
(74) *Attorney, Agent, or Firm* — Slater Matsil, LLP

(57) ABSTRACT

Embodiments of the present disclosure discloses a look-up table creation method and query method. The creation method includes: receiving a look-up table create message sent by a controller, where the look-up table create message includes an identifier of a look-up table and a look-up mode of the look-up table; creating a look-up table according to the look-up table create message and setting a look-up mode of the look-up table; receiving an entry add message sent by the controller, where the entry add message includes a to-be-added forwarding action and an index parameter of the forwarding action; and adding, according to the entry add message, an entry corresponding to the entry add message to the look-up table.

20 Claims, 4 Drawing Sheets

Related U.S. Application Data continuation of application No. PCT/CN2012/087445, filed on Dec. 25, 2012.

(51) Int. Cl.
*H04L 12/717* (2013.01)
*H04L 12/745* (2013.01)

(52) U.S. Cl.
CPC ............ *H04L 45/56* (2013.01); *H04L 45/563* (2013.01); *H04L 45/748* (2013.01)

(56) References Cited

U.S. PATENT DOCUMENTS

2007/0189317 A1    8/2007    Yang
2008/0275872 A1    11/2008   Venkatachary et al.
2010/0257263 A1    10/2010   Casado et al.
2011/0082866 A1    4/2011    Brown
2012/0063189 A1    3/2012    Maurya et al.
2013/0124707 A1    5/2013    Ananthapadmanabha et al.
2014/0241247 A1    8/2014    Kempf et al.
2014/0331280 A1    11/2014   Porras et al.
2015/0207724 A1    7/2015    Choudhury et al.
2015/0295825 A1    10/2015   Wang et al.

FOREIGN PATENT DOCUMENTS

| CN | 1983976 A   | 6/2007 |
| CN | 100461698 C | 2/2009 |
| CN | 101834690 A | 9/2010 |
| EP | 2562950 A1  | 2/2013 |

\* cited by examiner

LOOK-UP TABLE CREATION METHOD AND QUERY METHOD, CONTROLLER, FORWARDING DEVICE, AND SYSTEM

CROSS-REFERENCE TO RELATED APPLICATIONS

This is a continuation of U.S. patent application Ser. No. 14/749,261, filed on Jun. 24, 2015, which is a continuation of International Patent Application No. PCT/CN2012/087445, filed on Dec. 25, 2012. All of the afore-mentioned patent applications are hereby incorporated by reference in their entireties.

TECHNICAL FIELD

The present invention relates to the field of communications technologies, and in particular, to a look-up table creation method and query method, a controller, a forwarding device, and a system.

BACKGROUND

Data forwarding performance of a forwarding device significantly affects a transmission speed of network data. After entering the forwarding device, the network data is processed step by step according to an instruction of a forwarding action in each look-up table in the forwarding device, until the data is output from the forwarding device after jumping through several look-up tables.

In a SDN (software-defined networking) network architecture, these look-up tables in the forwarding device are created according to an instruction delivered by a controller, so as to customize a forwarding action of a network on the forwarding device.

When the network data jumps through the look-up tables of the forwarding device and a series of actions are performed, mask matching needs to be performed between a keyword carried in the network data and a keyword of each entry in each look-up table, and only a forwarding action in an entry whose keyword matches the keyword carried in the network data is performed. However, because a TCAM (ternary content addressable memory) circuit needs to be used in mask matching, a large quantity of chip resources are consumed, causing a large quantity of gate circuits on a chip and huge power consumption of the chip.

SUMMARY

Embodiments of the present invention provide a look-up table creation method and query method, a controller, a forwarding device, and a system, which can reduce a quantity of gate circuits and reduce power consumption.

To achieve the foregoing purposes, the following technical solutions are used in the embodiments of the present invention.

According to a first aspect, a look-up table creation method is provided. The method includes receiving a look-up table create message sent by a controller, where the look-up table create message includes an identifier of a look-up table and a look-up mode of the look-up table; and creating a look-up table according to the look-up table create message and setting a look-up mode of the look-up table. The method further includes receiving an entry add message sent by the controller, where the entry add message includes a to-be-added forwarding action and an index parameter of the forwarding action; and adding, according to the entry add message, an entry corresponding to the entry add message to the look-up table.

In a first possible implementation manner of the first aspect, the look-up mode includes one of a linear look-up mode, a hash look-up mode, a longest match look-up mode, and a mask look-up mode.

With reference to the first possible implementation manner of the first aspect, in a second possible implementation manner, the look-up mode of the look-up table is the linear look-up mode, and the index parameter includes a keyword. The adding, according to the entry add message, an entry corresponding to the entry add message to the look-up table includes obtaining an idle entry from the look-up table by using the keyword as an index; and writing the forwarding action into the idle entry.

With reference to the first possible implementation manner of the first aspect, in a third possible implementation manner, the look-up mode of the look-up table is the hash look-up mode, and the index parameter includes a keyword. The adding, according to the entry add message, an entry corresponding to the entry add message to the look-up table includes obtaining a bucket index by performing a hash operation on the keyword, and obtaining a hash bucket from the look-up table according to the bucket index; and writing the forwarding action and the keyword into an idle entry in the hash bucket.

With reference to the first possible implementation manner of the first aspect, in a fourth possible implementation manner, the look-up mode of the look-up table is the longest match look-up mode, and the index parameter includes a keyword and a mask length. The adding, according to the entry add message, an entry corresponding to the entry add message to the look-up table includes obtaining a longest match index by performing a first operation on the keyword and the mask length; finding an idle entry from the look-up table according to the longest match index; and writing the forwarding action, the keyword, and the mask length into the idle entry.

With reference to the first possible implementation manner of the first aspect, in a fifth possible implementation manner, the look-up mode of the look-up table is the mask look-up mode, the index parameter includes a keyword and a mask, and the adding, according to the entry add message, the forwarding action to the look-up table includes obtaining an idle entry from a ternary content addressable memory according to the keyword and the mask; and writing the forwarding action, the keyword, and the mask into the idle entry.

With reference to any one of the first to the fifth possible implementation manners of the first aspect, according to a second aspect, a method for querying a look-up table is provided. The method includes, when a packet jumps to the look-up table, extracting a keyword of the packet. The method further includes looking up, by using a look-up mode corresponding to the look-up table, an entry corresponding to the keyword; and executing a forwarding action in the found entry.

According to a third aspect, a forwarding device is provided. The forwarding device includes a receiving unit, configured to receive a look-up table create message sent by a controller, where the look-up table create message includes an identifier of a look-up table and a look-up mode of the look-up table. The receiving unit is further configured to receive an entry add message sent by the controller, where the entry add message includes a to-be-added forwarding action and an index parameter of the forwarding action. The forwarding device further includes a creating unit, configured to create a look-up table according to the look-up table create message and set a look-up mode of the look-up table; and an adding unit, configured to add, according to the entry add message, an entry corresponding to the entry add message to the look-up table.

In a first possible implementation manner of the third aspect, the look-up mode in the look-up table create message received by the receiving unit includes one of a linear look-up mode, a hash look-up mode, a longest match look-up mode, and a mask look-up mode.

With reference to the first possible implementation manner of the third aspect, in a second possible implementation manner, the look-up mode of the look-up table is the linear look-up mode, the index parameter includes a keyword, and the adding unit is specifically configured to obtain an idle entry from the look-up table by using the keyword as an index; and write the forwarding action into the idle entry.

With reference to the first possible implementation manner of the third aspect, in a third possible implementation manner, the look-up mode of the look-up table is the hash look-up mode, and the index parameter includes a keyword. The adding unit is specifically configured to obtain a bucket index by performing a hash operation on the keyword, and obtain a hash bucket from the look-up table according to the bucket index; and write the forwarding action and the keyword into an idle entry in the hash bucket.

With reference to the first possible implementation manner of the third aspect, in a fourth possible implementation manner, the look-up mode of the look-up table is the longest match look-up mode, and the index parameter includes a keyword and a mask length. The adding unit is specifically configured to obtain a longest match index by performing a first operation on the keyword and the mask length; find an idle entry from the look-up table according to the longest match index; and write the forwarding action, the keyword, and the mask length into the idle entry.

With reference to the first possible implementation manner of the third aspect, in a fifth possible implementation manner, the look-up mode of the look-up table is the mask look-up mode, the index parameter includes a keyword and a mask, and the adding unit is specifically configured to obtain an idle entry from a ternary content addressable memory according to the keyword and the mask, and write the forwarding action, the keyword, and the mask into the idle entry.

With reference to the third aspect and any one of the first to the fifth possible implementation manners of the third aspect, in a sixth possible implementation manner, the forwarding device further includes an extracting unit, configured to, when a packet jumps to the look-up table, extract a keyword of the packet. The forwarding device also includes a look-up unit, configured to look up, by using the look-up mode corresponding to the look-up table, an entry corresponding to the keyword; and an executing unit, configured to execute a forwarding action in the found entry.

According to a fourth aspect, a controller is provided. The controller includes a sending unit, configured to send a look-up table create message to a forwarding device, so that the forwarding device creates a look-up table, where the look-up table create message includes an identifier of the look-up table and a look-up mode of the look-up table. The sending unit is further configured to send an entry add message to the forwarding device, so that the forwarding device adds an entry to the look-up table, where the entry add message includes a to-be-added forwarding action and an index parameter of the forwarding action.

In a first possible implementation manner of the fourth aspect, the look-up mode in the look-up table create message sent by the sending unit includes one of a linear look-up mode, a hash look-up mode, a longest match look-up mode, and a mask look-up mode.

According to a fifth aspect, a forwarding device is provided. The forwarding device includes a memory, configured to store a software program and data; a wireless communication module, configured to receive a message sent by a controller; and a processor. The process is configured to execute the software program in the memory, so as to specifically execute receiving a look-up table create message sent by the controller, where the look-up table create message includes an identifier of a look-up table and a look-up mode of the look-up table. The process is further configured to execute the software program in the memory to execute receiving an entry add message sent by the controller, where the entry add message includes a to-be-added forwarding action and an index parameter of the forwarding action. The process is also configured to execute the software program in the memory to execute creating a look-up table according to the look-up table create message and setting a look-up mode of the look-up table; and adding, according to the entry add message, an entry corresponding to the entry add message to the look-up table.

In a first possible implementation manner of the fifth aspect, the look-up mode in the look-up table create message received by the processor includes one of a linear look-up mode, a hash look-up mode, a longest match look-up mode, and a mask look-up mode.

With reference to the first possible implementation manner of the fifth aspect, in a second possible implementation manner, the processor is further configured to, when a packet jumps to the look-up table, extract a keyword of the packet; look up, by using the look-up mode corresponding to the look-up table, an entry corresponding to the keyword; and execute a forwarding action in the found entry.

According to a sixth aspect, a controller is provided. The controller includes a memory, configured to store a software program and data; a wireless communication module, configured to send a message to a forwarding device; and a processor. The processor is configured to execute the software program in the memory, so as to specifically execute sending a look-up table create message to the forwarding device, so that the forwarding device creates a look-up table, where the look-up table create message includes an identifier of the look-up table and a look-up mode of the look-up table; and sending an entry add message to the forwarding device, so that the forwarding device adds an entry to the look-up table, where the entry add message includes a to-be-added forwarding action and an index parameter of the forwarding action.

According to a seventh aspect, a forwarding system is provided. The forwarding system includes a controller and a forwarding device, where the forwarding device is connected to the controller. The controller is configured to send a look-up table create message to the forwarding device, where the create message includes an identifier of the look-up table and a look-up mode of the look-up table, and send an entry add message to the forwarding device, where the entry add message includes a to-be-added forwarding action and an index parameter of the forwarding action. The forwarding device is configured to receive the look-up table create message; create a look-up table according to the create message and set the created look-up table by using the look-up mode; and add a corresponding entry to the look-up table according to the forwarding action and the index parameter that are in the entry add message.

According to the look-up table creation method and query method, the controller, the forwarding device, and the system that are provided in the embodiments of the present invention, a look-up table create message includes an identifier of a look-up table and a look-up mode of the look-up table, and different look-up modes are provided for different look-up tables, so that not look-ups in all look-up tables are limited to a mask matching mode, thereby significantly reducing a quantity of TCAM circuits used for mask matching. This reduces a quantity of gate circuits on a chip and reduces power consumption of the chip.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

With reference to accompanying drawings, the following describes in detail methods according to embodiments of the present invention.

Figure 1:
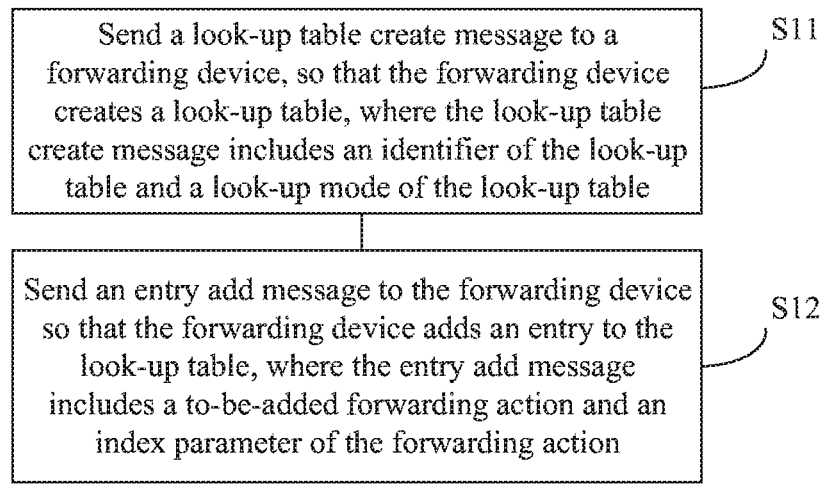
FIG. 1 is a flowchart of a look-up table creation method according to an embodiment of the present invention.

As shown in FIG. 1, an embodiment of the present invention provides a look-up table creation method, including:

S11. Send a look-up table create message to a forwarding device, so that the forwarding device creates a look-up table, where the look-up table create message includes an identifier of the look-up table and a look-up mode of the look-up table.

S12. Send an entry add message to the forwarding device, so that the forwarding device adds an entry to the look-up table, where the entry add message includes a to-be-added forwarding action and an index parameter of the forwarding action.

According to the look-up table creation method provided in this embodiment of the present invention, a look-up table create message includes an identifier of a look-up table and a look-up mode of the look-up table, and different look-up modes are provided for different look-up tables, so that not look-ups in all look-up tables are limited to a mask matching mode, thereby significantly reducing a quantity of TCAM circuits used for mask matching, which reduces a quantity of gate circuits on a chip and reduces power consumption of the chip.

It should be noted that, in a SDN network architecture, a controller may customize a forwarding action of a packet on the forwarding device by sending an instruction to the forwarding device. The instruction may be specifically represented by the look-up table create message sent in step S11 and the entry add message sent in step S12. By performing step S11 and step S12, the controller can create a look-up table on the forwarding device and insert a specific entry into the created look-up table. In an inserted entry, it is fundamental to write the forwarding action into the specific entry in the look-up table. In addition, in order that a location of each forwarding action in the look-up table can be determined, optionally, an index parameter corresponding to the forwarding action may further be written into an entry in which the forwarding action is located.

Specifically, a look-up mode is a method that is used, after a packet reaches each look-up table of the forwarding device, to separately find a forwarding action that needs to be performed for the packet. Each look-up table has its own look-up mode. For different look-up tables, different look-up modes may be created. However, a type of a look-up mode and a specific algorithm of each look-up mode are not limited. Optionally, in an embodiment of the present invention, for a look-up table, a look-up mode of the look-up table may be any one of a linear look-up mode, a hash look-up mode, a longest match look-up mode, and a mask look-up mode. Algorithms of the four look-up modes are different, calculation complexities are different, and required chip resources also differ greatly. For a look-up table with a relatively simple structure, when a packet jumps to the look-up table, a forwarding action that needs to be performed for the packet can be learned only by using a relatively simple look-up method. Therefore, the look-up table may be created according to the linear look-up mode or the hash look-up mode. However, for a look-up table with a relatively complex structure, the linear look-up mode or the hash look-up mode no longer meets a requirement for a look-up in the look-up table. Therefore, the look-up table needs to be created according to a more complex look-up mode, for example, created according to the longest match look-up mode or the mask look-up mode.

For example, in an embodiment of the present invention, if in the look-up table create message sent in step S11, the identifier of the look-up table is B1 and the look-up mode used by the look-up table B1 is the linear look-up mode, in the entry add message sent in step S12, the index parameter of the to-be-added forwarding action includes a keyword (key).

If in the look-up table create message sent in step S11, the identifier of the look-up table is B2 and the look-up mode used by the look-up table B2 is the hash look-up mode, in the entry add message sent in step S12, the index parameter of the to-be-added forwarding action also includes a keyword.

In the foregoing linear look-up mode and hash look-up mode, looking up an entry in the look-up table is relatively simple, and therefore, only a keyword needs to be used as the index parameter. However, in the following two look-up modes, looking up an entry in the look-up table is relatively complex. Therefore, in addition to the keyword, the index parameter of the forwarding action further includes a mask length or a mask.

Specifically, if in the look-up table create message sent in step S11, the identifier of the look-up table is B3 and the look-up mode used by the look-up table B3 is the longest match look-up mode, in the entry add message sent in step S12, the index parameter of the to-be-added forwarding action includes a keyword and a mask length.

Specifically, if in the look-up table create message sent in step S11, the identifier of the look-up table is B4 and the look-up mode used by the look-up table B4 is the mask look-up mode, in the entry add message sent in step S12, the index parameter of the to-be-added forwarding action includes a keyword and a mask.

Figure 2:
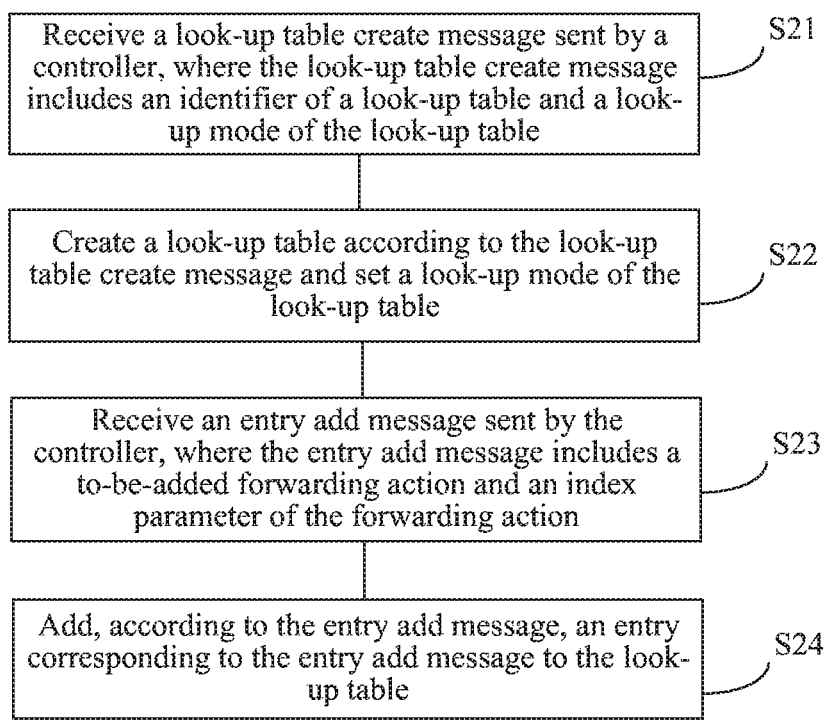
FIG. 2 is another flowchart of a look-up table creation method according to an embodiment of the present invention.

Correspondingly, as shown in FIG. 2, an embodiment of the present invention further provides a look-up table creation method. The method includes the following steps.

S21. Receive a look-up table create message sent by a controller, where the look-up table create message includes an identifier of a look-up table and a look-up mode of the look-up table.

S22. Create a look-up table according to the look-up table create message and set a look-up mode of the look-up table.

S23. Receive an entry add message sent by the controller, where the entry add message includes a to-be-added forwarding action and an index parameter of the forwarding action.

S24. Add, according to the entry add message, an entry corresponding to the entry add message to the look-up table.

According to the look-up table creation method provided in this embodiment of the present invention, a look-up table create message sent by a controller can be received, where the look-up table create message includes an identifier of a look-up table and a look-up mode of the look-up table, and different look-up modes and index parameters are provided for different look-up tables, so that not look-ups in all look-up tables are limited to a mask look-up mode. This significantly reduces a quantity of TCAM circuits used for mask matching, and reduces a quantity of gate circuits on a chip and reduces power consumption of the chip.

Optionally, the look-up mode may be any one of a linear look-up mode, a hash look-up mode, a longest match look-up mode, and a mask look-up mode. According to a difference of each look-up mode, the following separately describes operations of creating a look-up table in each look-up mode.

In an embodiment of the present invention, if in the look-up table create message received in step S21, the look-up mode of the look-up table is the linear look-up mode, in step S22, a look-up table is created according to the look-up table create message, and a look-up mode of the look-up table is set to the linear look-up mode. In step S23, the received entry add message includes the to-be-added forwarding action and the index parameter of the forwarding action, where the index parameter includes a keyword.

Then, in step S24, the adding, according to the entry add message, an entry corresponding to the entry add message to the look-up table may specifically include obtaining an idle entry from the look-up table by using the keyword as an index; and writing the forwarding action into the idle entry.

In this embodiment, the keyword in the index parameter and the entry in the look-up table have a linear relationship. Therefore, an idle entry can be obtained by directly using a value of the keyword as an index, and a forwarding action corresponding to the keyword is written into the idle entry, thereby simply and effectively completing look-up table creation and entry adding.

In another embodiment of the present invention, if in the look-up table create message received in step S21, the look-up mode of the look-up table is the hash look-up mode, in step S22, a look-up table is created according to the look-up table create message, and a look-up mode of the look-up table is set to the hash look-up mode. In step S23, the received entry add message includes the to-be-added forwarding action and the index parameter of the forwarding action, where the index parameter includes a keyword.

Then, in step S24, the adding, according to the entry add message, an entry corresponding to the entry add message to the look-up table may include obtaining a bucket index by performing a hash operation on the keyword, and obtaining a hash bucket from the look-up table according to the bucket index; and writing the forwarding action and the keyword into an idle entry in the hash bucket.

The hash operation is a function operation. A hash bucket index can be obtained after the hash function operation is performed on the keyword, and a hash bucket corresponding to the bucket index is obtained according to the hash bucket index. The hash bucket includes only indexes of several entries. Then, an idle entry may be found within a range of the hash bucket in which a quantity of entries is relatively small, and the forwarding action in the entry add message is written into the idle entry. In this way, first, an index look-up range is narrowed by performing a simple hash operation, and then an idle index is looked up within a relatively small range, so that creation of a relatively complex look-up table can be implemented in a relatively simple manner.

In another embodiment of the present invention, if in the look-up table create message received in step S21, the look-up mode of the look-up table is the longest match look-up mode, in step S22, a look-up table is created according to the look-up table create message, and a look-up mode of the look-up table is set to the longest match look-up mode. In step S23, the received entry add message includes the to-be-added forwarding action and the index parameter of the forwarding action, where the index parameter includes a keyword and a mask length.

Then, in step S24, the adding, according to the entry add message, an entry corresponding to the entry add message to the look-up table may include obtaining a longest match index by performing a first operation on the keyword and the mask length; finding an idle entry from the look-up table according to the longest match index; and writing the forwarding action, the keyword, and the mask length into the idle entry.

Specifically, first, the longest match index may be obtained by performing a first operation on the keyword and the mask length, where the first operation may be an operation or processing in which the longest match index can be obtained by using the keyword and the mask length.

For example, a binary tree is created by using the keyword and the mask length, where the binary tree may be used as an obtained longest match index.

Optionally, in this embodiment, the mask length is directly written into the idle entry. In another embodiment of the present invention, a mask may also be written into the idle entry. In this way, the mask length can be determined by using the mask, and therefore, longest match look-up may be performed likewise.

In another embodiment of the present invention, if in the look-up table create message received in step S21, the look-up mode of the look-up table is the mask look-up mode, in step S22, a look-up table is created according to the look-up table create message, and a look-up mode of the look-up table is set to the mask look-up mode. In step S23, the received entry add message includes the to-be-added forwarding action and the index parameter of the forwarding action, where the index parameter includes a keyword and a mask.

Then, in step S24, the adding, according to the entry add message, an entry corresponding to the entry add message to the look-up table includes obtaining an idle entry by processing the keyword and the mask by using a TCAM; and writing the forwarding action, the keyword, and the mask into the idle entry.

In this embodiment, mask matching needs to be implemented in a TCAM manner, and a circuit structure is relatively complex. However, in this embodiment, a structure of the created look-up table is relatively complex, and the foregoing three look-up methods can no longer meet look-up table creation and look-up requirements in this embodiment. Therefore, it is indeed necessary to use a mask look-up mode so that a resource in the forwarding device is not wasted.

It should be noted that, during creation of the look-up tables in the foregoing four look-up modes, the forwarding action and the index parameter of the forwarding action that are in the entry add message are necessary. However, for a look-up table in the linear look-up mode, a look-up algorithm is simple, and therefore, the index parameter does not need to be written into a specific entry of the look-up table. However, for a look-up table in the hash look-up mode, the longest match look-up mode, or the mask look-up mode, a look-up algorithm is relatively complex, and therefore, an index parameter needs to be written into a corresponding entry in the look-up table.

In the foregoing embodiments of the four look-up modes, according to the look-up table creation method provided in the present invention, a proper look-up mode can be determined, according to a complexity of a to-be-created look-up table, for each created look-up table. In this way, for many look-up tables with a relatively simple structure, a relatively simple look-up mode, such as a linear look-up mode, a hash look-up mode, or a longest match look-up mode, may be used, and a mask look-up mode is used only for those look-up tables that have complex structures and that must be created and looked up by using the mask look-up mode. Therefore, a resource in a forwarding device is fully used, a quantity of TCAM circuits used for mask matching is significantly reduced, a quantity of gate circuits on a chip is reduced, and power consumption of the chip is reduced.

Figure 3:
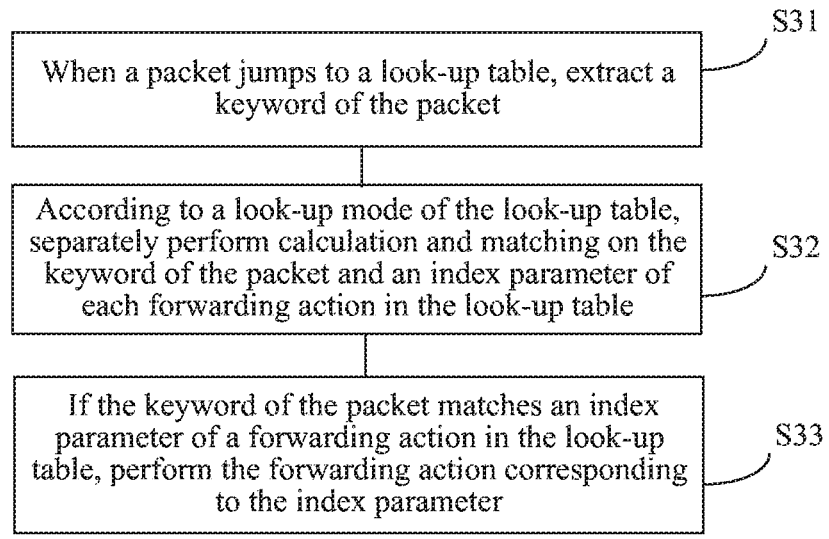
FIG. 3 is a flowchart of a method for querying a look-up table according to an embodiment of the present invention.

Correspondingly, an embodiment of the present invention further provides a method for querying a look-up table. As shown in FIG. 3, the method includes the following steps.

S31. When a packet jumps to the look-up table, extract a keyword of the packet.

S32. Look up, by using a look-up mode corresponding to the look-up table, an entry corresponding to the keyword.

S33. Execute a forwarding action in the found entry.

Specifically, in step S32, methods for looking up an entry corresponding to the keyword vary according to different look-up modes used by the look-up table.

Specifically, if a look-up table FLOW_TABLE_1 uses the linear look-up mode, when forwarding a packet, a forwarding device extracts a keyword when packet jumps to the FLOW_TABLE_1, and uses the keyword is as an index to directly look up in the FLOW_TABLE_1, so as to obtain a forwarding operation that needs to be performed by the forwarding device.

If a look-up table FLOW_TABLE_2 uses the hash look-up mode, when forwarding a packet, a forwarding device extracts a keyword when the packet jumps to the FLOW_TABLE_2, obtains a hash bucket index by performing a hash operation on the keyword, looks up an entry, in the bucket, whose keyword is equal to the looked-up keyword in this keyword, and reads and executes a forwarding action in the entry.

If a look-up table FLOW_TABLE_3 uses the longest match look-up mode, when forwarding a packet, a forwarding device extracts a keyword when the packet jumps to the FLOW_TABLE_3, obtains a longest match index by performing a first operation on the keyword, looks up, in the look-up table, an entry whose keyword is equal to the looked-up keyword in this keyword, and reads and executes a forwarding action in the entry.

If a look-up table FLOW_TABLE_4 uses the mask look-up mode, when forwarding a packet, a forwarding device extracts a keyword when the packet jumps to the FLOW_TABLE_4, looks up the keyword in the TCAM, and when an entry is hit, reads and executes a forwarding action in the entry.

Figure 4:
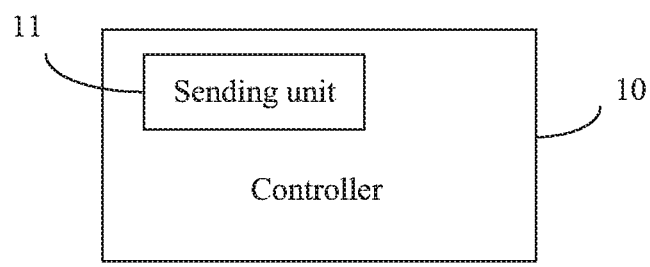
FIG. 4 is a schematic structural diagram of a controller according to an embodiment of the present invention.

Correspondingly, as shown in FIG. 4, an embodiment of the present invention further provides a controller 10. The controller 10 includes a sending unit 11, configured to send a look-up table create message to a forwarding device, so that the forwarding device creates a look-up table, where the look-up table create message includes an identifier of the look-up table and a look-up mode of the look-up table. The sending unit 11 is further configured to send an entry add message to the forwarding device, so that the forwarding device adds an entry to the look-up table, where the entry add message includes a to-be-added forwarding action and an index parameter of the forwarding action.

According to the controller 10 provided in this embodiment of the present invention, a sending unit 11 sends a look-up table create message to a forwarding device, where the look-up table create message includes an identifier of a look-up table and a look-up mode of the look-up table, and different look-up modes are provided for different look-up tables, so that not look-ups in all look-up tables are limited to a mask matching mode. This significantly reduces a quantity of TCAM circuits used for mask matching, and reduces a quantity of gate circuits on a chip and reduces power consumption of the chip.

Optionally, the look-up mode in the look-up table create message sent by the sending unit 11 includes one of a linear look-up mode, a hash look-up mode, a longest match look-up mode, and a mask look-up mode.

Figure 5:
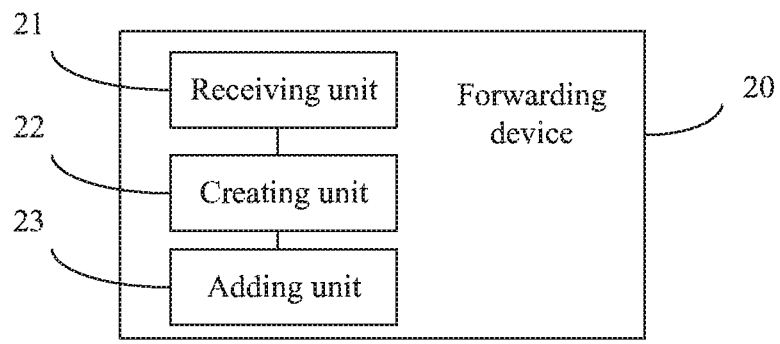
FIG. 5 is a schematic structural diagram of a forwarding device according to an embodiment of the present invention.

Correspondingly, as shown in FIG. 5, an embodiment of the present invention further provides a forwarding device 20. The forwarding device 20 includes a receiving unit 21, configured to receive a look-up table create message sent by a controller, where the look-up table create message includes an identifier of a look-up table and a look-up mode of the look-up table. The receiving unit 21 is further configured to receive an entry add message sent by the controller, where the entry add message includes a to-be-added forwarding action and an index parameter of the forwarding action. The forwarding device 20 further includes a creating unit 22, configured to create a look-up table according to the look-up table create message and set a look-up mode of the look-up table; and an adding unit 23, configured to add, according to the entry add message, an entry corresponding to the entry add message to the look-up table.

According to the forwarding device 20 provided in this embodiment of the present invention, a receiving unit 21 can receive a look-up table create message, where the look-up table create message includes an identifier of a look-up table and a look-up mode of the look-up table, and different look-up modes are provided for different look-up tables; and a creating unit 22 and an adding unit 23 create look-up tables in these different look-up modes and add an entry to the look-up tables, so that not look-ups in all look-up tables are limited to a mask matching mode. This significantly reduces a quantity of TCAM circuits used for mask matching, and reduces a quantity of gate circuits on a chip and reduces power consumption of the chip.

Optionally, the look-up mode in the look-up table create message received by the receiving unit 21 includes one of a linear look-up mode, a hash look-up mode, a longest match look-up mode, and a mask look-up mode.

Optionally, if the look-up mode of the look-up table is the linear look-up mode and the index parameter includes a keyword, the adding unit 23 is specifically configured to obtain an idle entry from the look-up table by using the keyword as an index; and write the forwarding action into the idle entry.

Optionally, if the look-up mode of the look-up table is the hash look-up mode and the index parameter includes a keyword, the adding unit 23 is specifically configured to obtain a bucket index by performing a hash operation on the keyword, and obtain a hash bucket from the look-up table according to the bucket index; and write the forwarding action and the keyword into an idle entry in the hash bucket.

Optionally, if the look-up mode of the look-up table is the longest match look-up mode and the index parameter includes a keyword and a mask length, the adding unit 23 is specifically configured to obtain a longest match index by performing a first operation on the keyword and the mask length; find an idle entry from the look-up table according to the longest match index; and write the forwarding action, the keyword, and the mask length into the idle entry.

Optionally, if the look-up mode of the look-up table is the mask look-up mode and the index parameter includes a keyword and a mask, the adding unit 23 is specifically configured to obtain an idle entry from a ternary content addressable memory according to the keyword and the mask; and write the forwarding action, the keyword, and the mask into the idle entry.

Figure 6:
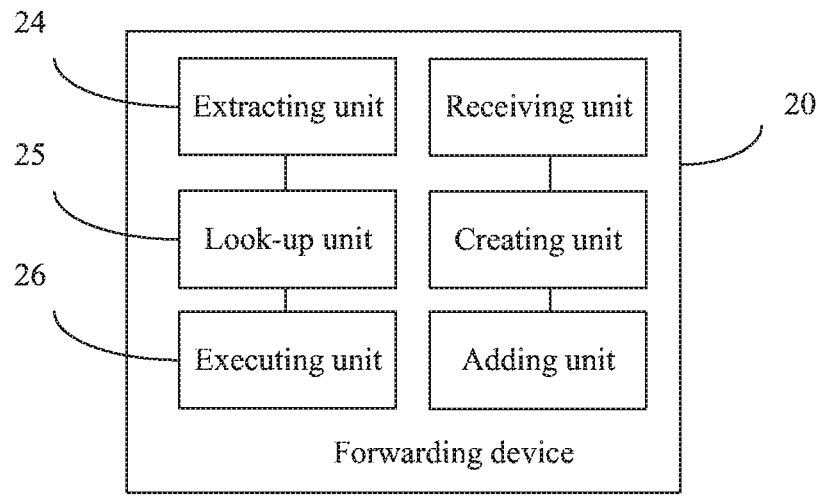
FIG. 6 is a schematic structural diagram of another forwarding device according to an embodiment of the present invention.

Further, as shown in FIG. 6, in another embodiment of the present invention, the forwarding device 20 may further include an extracting unit 24, configured to, when a packet jumps to the look-up table, extract a keyword of the packet; a look-up unit 25, configured to look up, by using the look-up mode corresponding to the look-up table, an entry corresponding to the keyword; and an executing unit 26, configured to execute a forwarding action in the found entry.

In this way, when a packet jumps to the look-up table, a forwarding action can be looked up according to look-up modes of different look-up tables, so that not look-ups in all look-up tables are limited to a mask look-up mode. This significantly reduces a quantity of TCAM circuits used for mask matching, and reduces a quantity of gate circuits on a chip and reduces power consumption of the chip.

Figure 7:
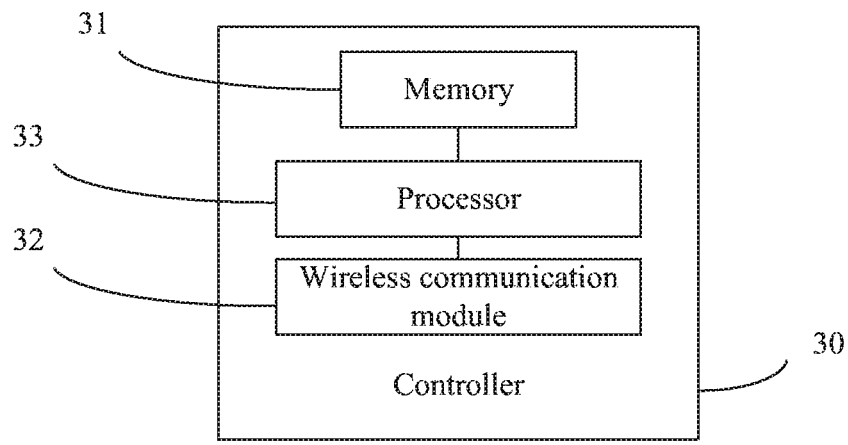
FIG. 7 is a schematic structural diagram of another controller according to an embodiment of the present invention.

Correspondingly, as shown in FIG. 7, an embodiment of the present invention further provides a controller 30, and the controller 30 includes a memory 31, a wireless communication module 32, and a processor 33.

The memory 31 is configured to store a software program and data.

The wireless communication module 32 is configured to send a message to a forwarding device, and in particular, send a message of the processor 33 to the forwarding device.

Generally, the wireless communication module 32 includes but is not limited to Bluetooth, WiFi, and the like.

The processor 33 is configured to execute the software program in the memory, so as to specifically execute the steps of sending a look-up table create message to the forwarding device, so that the forwarding device creates a look-up table, where the look-up table create message includes an identifier of the look-up table and a look-up mode of the look-up table; and sending an entry add message to the forwarding device, so that the forwarding device adds an entry to the look-up table, where the entry add message includes a to-be-added forwarding action and an index parameter of the forwarding action.

According to the controller 30 provided in this embodiment of the present invention, a look-up table create message is sent to a forwarding device, where the look-up table create message includes an identifier of a look-up table and a look-up mode of the look-up table, and different look-up modes are provided for different look-up tables, so that not look-ups in all look-up tables are limited to a mask matching mode. This significantly reduces a quantity of TCAM circuits used for mask matching, and reduces a quantity of gate circuits on a chip and reduces power consumption of the chip.

Optionally, the look-up mode in the look-up table create message sent by the processor 33 includes one of a linear look-up mode, a hash look-up mode, a longest match look-up mode, and a mask look-up mode.

Figure 8:
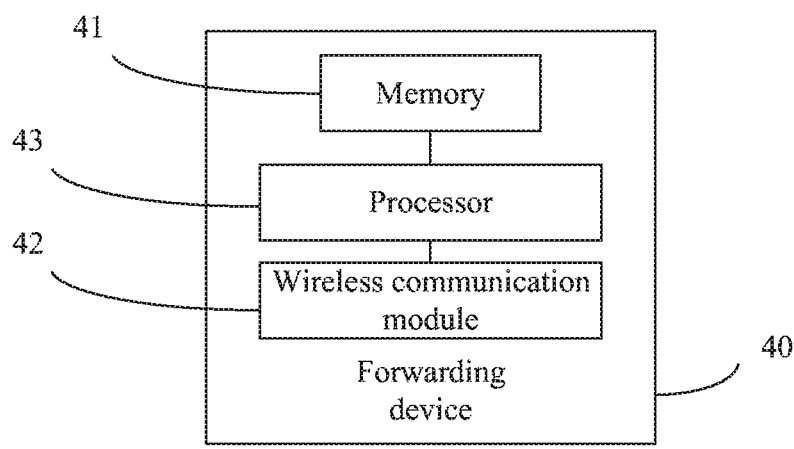
FIG. 8 is a schematic structural diagram of yet another forwarding device according to an embodiment of the present invention.

Correspondingly, as shown in FIG. 8, an embodiment of the present invention further provides a forwarding device 40, and the forwarding device 40 includes a memory 41, a wireless communication module 42, and a processor 43.

The memory 41 is configured to store a software program and data.

The wireless communication module 42 is configured to receive a message sent by a controller, and in particular, send the message sent by the controller to the processor 43 for processing.

Generally, the wireless communication module includes but is not limited to Bluetooth, WiFi, and the like.

The processor 43 is configured to execute the software program in the memory, so as to specifically execute the steps of receiving a look-up table create message sent by the controller, where the look-up table create message includes an identifier of a look-up table and a look-up mode of the look-up table; receiving an entry add message sent by the controller, where the entry add message includes a to-be-added forwarding action and an index parameter of the forwarding action; creating a look-up table according to the look-up table create message and setting a look-up mode of the look-up table; and adding, according to the entry add message, an entry corresponding to the entry add message to the look-up table.

According to the forwarding device 40 provided in this embodiment of the present invention, a look-up table create message can be received, where the look-up table create message includes an identifier of a look-up table and a look-up mode of the look-up table, and different look-up modes are provided for different look-up tables; and look-up tables of these different look-up modes are created and an entry is added to the look-up tables, so that not look-ups in all look-up tables are limited to a mask matching mode. This significantly reduces a quantity of TCAM circuits used for mask matching, and reduces a quantity of gate circuits on a chip and reduces power consumption of the chip.

Optionally, the look-up mode in the look-up table create message received by the processor 43 includes one of a linear look-up mode, a hash look-up mode, a longest match look-up mode, and a mask look-up mode.

Specifically, the look-up mode of the look-up table is the linear look-up mode, the index parameter includes a keyword, and the processor 43 is specifically configured to obtain an idle entry from the look-up table by using the keyword as an index; and write the forwarding action into the idle entry.

Specifically, the look-up mode of the look-up table is the hash look-up mode, the index parameter includes a keyword, and the processor 43 is specifically configured to obtain a bucket index by performing a hash operation on the keyword, and obtain a hash bucket from the look-up table according to the bucket index; and write the forwarding action and the keyword into an idle entry in the hash bucket.

Specifically, the look-up mode of the look-up table is the longest match look-up mode, and the index parameter includes a keyword and a mask length. The processor 43 is specifically configured to obtain a longest match index by performing a first operation on the keyword and the mask length; find an idle entry from the look-up table according to the longest match index; and write the forwarding action, the keyword, and the mask length into the idle entry.

Specifically, the look-up mode of the look-up table is the mask look-up mode, and the index parameter includes a keyword and a mask. The processor 43 is specifically configured to obtain an idle entry from a ternary content addressable memory according to the keyword and the mask; and write the forwarding action, the keyword, and the mask into the idle entry.

Further, the processor 43 is further configured to, when a packet jumps to the look-up table, extract a keyword of the packet; look up, by using the look-up mode corresponding to the look-up table, an entry corresponding to the keyword; and execute a forwarding action in the found entry.

Figure 9:
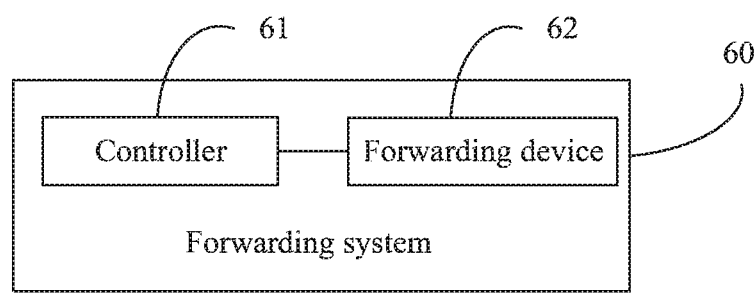
FIG. 9 is a schematic structural diagram of a forwarding system according to an embodiment of the present invention.

Correspondingly, as shown in FIG. 9, an embodiment of the present invention further provides a forwarding system 60. The forwarding system 60 includes a controller 61 and a forwarding device 62, and the forwarding device 62 is connected to the controller 61.

The controller 61 is configured to send a look-up table create message to the forwarding device 62, where the create message includes an identifier of the look-up table and a look-up mode of the look-up table, and send an entry add message to the forwarding device 62, where the entry add message includes a to-be-added forwarding action and an index parameter of the forwarding action.

The forwarding device 62 is configured to receive the look-up table create message; create a look-up table according to the create message and set the created look-up table by using the look-up mode; and add a corresponding entry to the look-up table according to the forwarding action and the index parameter that are in the entry add message.

According to the forwarding system 60 provided in this embodiment of the present invention, a look-up table create message includes an identifier of a look-up table and a look-up mode of the look-up table, and different look-up modes are provided for different look-up tables, so that not look-ups in all look-up tables are limited to a mask matching mode. This significantly reduces a quantity of TCAM circuits used for mask matching, and reduces a quantity of gate circuits on a chip and reduces power consumption of the chip.

Based on the foregoing descriptions of the implementation manners, a person skilled in the art may clearly understand that embodiments of the present invention may be implemented by software in addition to necessary universal hardware or by hardware only. In most circumstances, the former is a preferred implementation manner. Based on such an understanding, the technical solutions of the present invention essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of the present invention.

The foregoing descriptions are merely specific implementation manners of the embodiments of the present invention, but are not intended to limit the protection scope of the present invention. Any variation or replacement readily figured out by a person skilled in the art within the technical scope disclosed in the embodiments of the present invention shall fall within the protection scope of the present invention. Therefore, the protection scope of the present invention shall be subject to the protection scope of the claims.

What is claimed is:

1. A method, comprising:
receiving, at a forwarding device disposed in a communications network, a look-up table create message sent by a controller for creating a look-up table, wherein the look-up table create message comprises an identifier of the look-up table and a look-up mode of the look-up table, the look-up mode of the look-up table indicating how a look-up is performed in the look-up table;
creating the look-up table at the forwarding device according to the look-up table create message, the look-up table having the look-up mode in the look-up table create message;
receiving, at the forwarding device, an entry add message sent by the controller, wherein the entry add message comprises a to-be-added forwarding action and an index parameter of the to-be-added forwarding action; and
adding, by the forwarding device and according to the entry add message, an entry corresponding to the entry add message to the look-up table using an idle entry in the look-up table.

2. The method according to claim 1, wherein the look-up mode comprises a linear look-up mode, a hash look-up mode, a longest match look-up mode, or a mask look-up mode.

3. The method according to claim 2, wherein the look-up mode of the look-up table is the linear look-up mode, the index parameter comprises a keyword, and adding, by the forwarding device and according to the entry add message, the entry corresponding to the entry add message to the look-up table comprises:

obtaining, by the forwarding device, an idle entry from the look-up table using the keyword as an index; and writing the to-be-added forwarding action by the forwarding device into the idle entry.

4. The method according to claim 2, wherein the look-up mode of the look-up table is the hash look-up mode, the index parameter comprises a keyword, and adding, by the forwarding device and according to the entry add message, the entry corresponding to the entry add message to the look-up table comprises:

obtaining, by the forwarding device, a bucket index by performing a hash operation on the keyword, and obtaining a hash bucket from the look-up table according to the bucket index; and writing, by the forwarding device, the to-be-added forwarding action and the keyword into an idle entry in the hash bucket.

5. The method according to claim 2, wherein the look-up mode of the look-up table is the longest match look-up mode, the index parameter comprises a keyword and a mask length, and adding, by the forwarding device and according to the entry add message, the entry corresponding to the entry add message to the look-up table comprises:

obtaining, by the forwarding device, a longest match index by performing a first operation on the keyword and the mask length;

finding an idle entry from the look-up table by the forwarding device and according to the longest match index; and writing, by the forwarding device, the to-be-added forwarding action, the keyword, and the mask length into the idle entry.

6. The method according to claim 2, wherein the look-up mode of the look-up table is the mask look-up mode, the index parameter comprises a keyword and a mask, and adding, according to the entry add message, the to-be-added forwarding action to the look-up table comprises:

obtaining an idle entry from a ternary content addressable memory according to the keyword and the mask; and writing the to-be-added forwarding action, the keyword, and the mask into the idle entry.

7. The method according to claim 1, further comprising:

extracting a keyword of a packet by the forwarding device and in response to the packet jumping to the look-up table;

looking up, by the forwarding device and using the look-up mode corresponding to the look-up table, an entry corresponding to the keyword; and executing, by the forwarding device, a forwarding action in the entry corresponding to the keyword.

8. One or more non-transitory computer-readable storage media storing instructions that, when executed by one or more processors, cause the one or more processors to perform operations comprising:

creating a look-up table according to a look-up table create message, the look-up table received by a receiver and sent by a controller over a communications network for creating the look-up table, wherein the look-up table create message comprises an identifier of the look-up table and a look-up mode of the look-up table, the look-up mode of the look-up table indicating how a look-up is performed in the look-up table, the look-up table having the look-up mode in the look-up table create message; and adding, according to an entry add message received by the receiver and sent by the controller for adding an entry in the look-up table, the entry corresponding to the entry add message to the look-up table using an idle entry that is determined according to an index parameter of a to-be-added forwarding action and the look-up mode of the look-up table, the entry add message comprising the to-be-added forwarding action and the index parameter of the to-be-added forwarding action, the entry comprising the to-be-added forwarding action and the index parameter.

9. The one or more non-transitory computer-readable storage media according to claim 8, wherein the look-up mode in the look-up table create message received by the receiver comprises a linear look-up mode, a hash look-up mode, a longest match look-up mode, or a mask look-up mode.

10. The one or more non-transitory computer-readable storage media according to claim 9, wherein:

the look-up mode of the look-up table is the linear look-up mode, and the index parameter comprises a keyword; and adding, according to the entry add message, the entry corresponding to the entry add message to the look-up table comprises:

obtaining an idle entry from the look-up table using the keyword as an index; and writing the to-be-added forwarding action into the idle entry.

11. The one or more non-transitory computer-readable storage media according to claim 9, wherein:

the look-up mode of the look-up table is the hash look-up mode, and the index parameter comprises a keyword; and adding, according to the entry add message, the entry corresponding to the entry add message to the look-up table comprises:

obtaining a bucket index by performing a hash operation on the keyword, and obtain a hash bucket from the look-up table according to the bucket index; and writing the to-be-added forwarding action and the keyword into an idle entry in the hash bucket.

12. The one or more non-transitory computer-readable storage media according to claim 9, wherein:

the look-up mode of the look-up table is the longest match look-up mode, and the index parameter comprises a keyword and a mask length; and adding, according to the entry add message, the entry corresponding to the entry add message to the look-up table comprises:

obtaining a longest match index by performing a first operation on the keyword and the mask length;

finding an idle entry from the look-up table according to the longest match index; and writing the to-be-added forwarding action, the keyword, and the mask length into the idle entry.

13. The one or more non-transitory computer-readable storage media according to claim 9, wherein:

the look-up mode of the look-up table is the mask look-up mode, and the index parameter comprises a keyword and a mask; and adding, according to the entry add message, the entry corresponding to the entry add message to the look-up table comprises:

obtaining an idle entry from a ternary content addressable memory according to the keyword and the mask; and writing the to-be-added forwarding action, the keyword, and the mask into the idle entry.

14. The one or more non-transitory computer-readable storage media according to claim 8, wherein the operations further comprise:
- extracting a keyword of a packet in response to the packet jumping to the look-up table;
- looking up, using the look-up mode corresponding to the look-up table, an entry corresponding to the keyword; and
- executing a forwarding action in the entry corresponding to the keyword.

15. One or more non-transitory computer-readable storage media storing instructions that, when executed by one or more processors, cause the one or more processors to perform operations comprising:
- sending, using a transmitter, a look-up table create message to a forwarding device disposed in a communications network, causing the forwarding device to create a look-up table according to the look-up table create message, wherein the look-up table create message comprises an identifier of the look-up table and a look-up mode of the look-up table, the look-up mode of the look-up table indicating how a look-up is performed in the look-up table;
- sending, using the transmitter, an entry add message to the forwarding device, causing the forwarding device to add an entry to the look-up table according to the entry add message; and
- wherein the entry add message comprises a to-be-added forwarding action and an index parameter of the to-be-added forwarding action, wherein the entry comprises the to-be-added forwarding action and the index parameter, and the entry is added using an idle entry determined according to the index parameter and the look-up mode.

16. One or more non-transitory computer-readable storage media storing instructions that, when executed by one or more processors, cause the one or more processors to perform operations comprising:
- receiving, using a transceiver, look-up table create messages sent by a controller over a communications network for creating look-up tables, wherein each of the look-up table create messages comprises an identifier of a corresponding look-up table and a look-up mode of the corresponding look-up table, and the look-up mode of the corresponding look-up table indicates how a look-up is performed in the corresponding look-up table, and wherein at least two of the look-up tables have different look-up modes, and at least one of the look-up tables has a look-up mode that performs a look-up without using a mask matching technique;
- receiving, using the transceiver, an entry add message sent by the controller for adding an entry in a first look-up table of the look-up tables, wherein the entry add message comprises a to-be-added forwarding action and an index parameter of the to-be-added forwarding action for the entry;
- creating the look-up tables according to the look-up table create messages, each of the look-up tables having a look-up mode indicated in a corresponding look-up table create message; and
- adding, according to the entry add message, the entry corresponding to the entry add message to the first look-up table, the entry being added using an idle entry in the first look-up table that is determined according to the index parameter of the to-be-added forwarding action and a look-up mode of the first look-up table, and the entry comprising the to-be-added forwarding action and the index parameter.

17. The one or more non-transitory computer-readable storage media according to claim 16, wherein a look-up mode in a look-up table create message received by the processor comprises a linear look-up mode, a hash look-up mode, a longest match look-up mode, or a mask look-up mode.

18. The one or more non-transitory computer-readable storage media according to claim 16, wherein the operations further comprise:
- extracting a keyword of a packet in response to the packet jumping to the first look-up table;
- looking up, using the look-up mode corresponding to the first look-up table, an entry corresponding to the keyword; and
- executing a forwarding action in the entry.

19. One or more non-transitory computer-readable storage media storing instructions that, when executed by one or more processors, cause the one or more processors to perform operations comprising:
- sending, using a transceiver, look-up table create messages to a forwarding device, causing the forwarding device to create look-up tables according to the look-up table create messages, wherein each of the look-up table create messages indicates an identifier of a corresponding look-up table and a look-up mode of the corresponding look-up table, and the look-up mode of the corresponding look-up table indicates how a look-up is performed in the corresponding look-up table, and wherein at least two of the look-up tables have different look-up modes, and at least one of the look-up tables has a look-up mode that performs a look-up without using a mask matching technique; and
- sending, using the transceiver, an entry add message to the forwarding device, causing the forwarding device to add an entry to a first look-up table in the look-up tables, wherein the entry add message comprises a to-be-added forwarding action and an index parameter of the to-be-added forwarding action, the entry being added using an idle entry in the first look-up table that is determined according to the index parameter of the to-be-added forwarding action and a look-up mode of the first look-up table, and the entry comprising the to-be-added forwarding action and the index parameter.

20. A forwarding system, comprising:
- a controller; and
- a forwarding device disposed in a communications network, wherein the forwarding device is signally connected to the controller;
- wherein the controller is configured to send a look-up table create message to the forwarding device for creating a look-up table, wherein the look-up table create message comprises an identifier of the look-up table and a look-up mode of the look-up table, the look-up mode of the look-up table indicating how a look-up is performed in the look-up table;
- wherein the controller is further configured to send an entry add message to the forwarding device for adding an entry in the look-up table, wherein the entry add message comprises a to-be-added forwarding action and an index parameter of the to-be-added forwarding action; and
- wherein the forwarding device is configured to receive the look-up table create message.

* * * * *